United States Patent
Yoshioka

(10) Patent No.: US 10,821,390 B2
(45) Date of Patent: Nov. 3, 2020

(54) HONEYCOMB FILTER

(71) Applicant: NGK Insulators, Ltd., Nagoya (JP)

(72) Inventor: Fumihiko Yoshioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 58 days.

(21) Appl. No.: 16/298,215

(22) Filed: Mar. 11, 2019

(65) Prior Publication Data

US 2019/0299147 A1   Oct. 3, 2019

(30) Foreign Application Priority Data

Mar. 29, 2018 (JP) ................... 2018-064170

(51) Int. Cl.
*F01N 3/022* (2006.01)
*B01D 46/24* (2006.01)

(52) U.S. Cl.
CPC ....... *B01D 46/2455* (2013.01); *B01D 46/247* (2013.01); *B01D 46/2429* (2013.01); *B01D 46/2474* (2013.01); *F01N 3/0222* (2013.01); *B01D 2046/2433* (2013.01); *B01D 2046/2437* (2013.01); *B01D 2046/2481* (2013.01); *B01D 2279/30* (2013.01)

(58) Field of Classification Search
CPC .............. F01N 3/0222; B01D 46/2429; B01D 46/2455; B01D 46/2474; B01D 2046/2481
USPC .............................. 422/177; 55/523; 428/118
See application file for complete search history.

(56) References Cited

U.S. PATENT DOCUMENTS

| | | | |
|---|---|---|---|
| 6,696,130 B1 * | 2/2004 | Kasai | C04B 38/0006 264/628 |
| 2003/0024219 A1 | 2/2003 | Harada et al. | |
| 2005/0202971 A1 * | 9/2005 | DiFrancesco | B01J 23/22 502/439 |
| 2006/0193756 A1 * | 8/2006 | Suzuki | B01J 35/108 422/177 |
| 2010/0062212 A1 * | 3/2010 | Weissman | C01B 3/40 428/118 |
| 2012/0251768 A1 * | 10/2012 | Sendo | C04B 35/195 428/116 |
| 2012/0255021 A1 * | 10/2012 | Sallam | G06F 21/566 726/25 |
| 2013/0059724 A1 * | 3/2013 | Hirose | B01D 46/2429 502/80 |
| 2017/0274323 A1 * | 9/2017 | Yamamoto | B01D 46/247 |
| 2017/0274354 A1 * | 9/2017 | Yamamoto | B01J 35/04 |

FOREIGN PATENT DOCUMENTS

JP   2001-269585 A1   10/2001
JP   2013-227882 A1   11/2013

* cited by examiner

*Primary Examiner* — Tom P Duong
(74) *Attorney, Agent, or Firm* — Burr & Brown, PLLC

(57) ABSTRACT

A honeycomb filter includes a pillar-shaped honeycomb structure body having a porous partition wall surrounding cells each of which has one end plugged by a plugging portion. An open frontal area O (%) of the cells in the honeycomb structure body is 75 to 80%, a porosity P (%) of the partition wall measured by a mercury press-in method is 52 to 58%, an average pore diameter D (μm) of the partition wall measured by the mercury press-in method is 6 to 12 μm, and a pore volume rate A (%) of pores whose pore diameters are not less than 20 μm with respect to an overall pore volume of the partition wall is not more than 13.5%.

16 Claims, 2 Drawing Sheets

HONEYCOMB FILTER

The present application is an application based on JP 2018-064170 filed on Mar. 29 2018 with Japan Patent Office, the entire contents of which are incorporated herein by reference.

BACKGROUND OF THE INVENTION

Field of the Invention

The present invention relates to a honeycomb filter. More particularly, the present invention relates to a honeycomb filter that can suppress the rise in pressure loss and achieve the improvement of filtration efficiency while suppressing the decrease in isostatic strength.

Description of the Related Art

In various industries, an internal combustion engine is used as a power source. Exhaust gas emitted from an internal combustion engine during the combustion of fuel includes particulate matter such as soot and ash as well as poisonous gas such as nitrogen oxide. Hereinafter, particulate matter may be called "PM". The "PM" is an abbreviation of "Particulate Matter". Recently, a regulation on the removal of PM emitted from a diesel engine becomes globally severe, and thus a wall-flow type filter having a honeycomb structure is used as a filter to remove PM, for example.

A honeycomb filter that includes a honeycomb substrate in which a plurality of cells acting as fluid through channels is defined by a porous partition wall and a plugging portion that is disposed at one of open ends of each of the plurality of cells has been variously proposed as a wall-flow type filter (e.g., see Patent Documents 1 and 2). In such the honeycomb filter, for example, inflow cells in which plugging portions are disposed at the outflow end face and outflow cells in which plugging portions are disposed at the inflow end face are alternately arranged with the partition wall therebetween so that the porous partition wall functions as a filter body that removes PM.

[Patent Document 1] JP-A-2001-269585
[Patent Document 2] JP-A-2013-227882

In recent years, a honeycomb filter to purify exhaust gas emitted from the engine of an automobile requires the improvement of purification performance in order to cope with exhaust gas regulations that are strengthened year by year from the consideration for environmental problems. In order to correspond to this, weight saving of the honeycomb filter is required to raise a rate of temperature increase of a catalyst loaded in the honeycomb filter and early activate the catalyst, for example. The development etc. of "high porosity" of further increasing the porosity of the porous partition wall is promoted as one of the countermeasures.

However, the honeycomb filter in which the porosity of the partition wall is increased is concerned about strength. For example, when the honeycomb filter is accommodated inside a can body acting as a housing of an exhaust gas purification device etc., there is a problem that breakage tends to occur due to a compression surface pressure applied to the honeycomb filter. Hereinafter, accommodating the honeycomb filter inside a can body acting as a housing of an exhaust gas purification device etc. may be called "canning".

On the other hand, it is effective to lower the porosity of the partition wall in order to increase the strength of the honeycomb filter, but the pressure loss of the honeycomb filter becomes higher and thus the engine output reduction of the automobile is caused when simply lowering the porosity of the partition wall. Moreover, a method of lowering the open frontal area of cells acting as the through channels of exhaust gas is also considered in order to increase the strength of the honeycomb filter, but the engine output reduction of the automobile is caused also in this case.

The present invention has been achieved in view of the problems of the above conventional technology. According to the present invention, there is provided a honeycomb filter that can suppress the rise in pressure loss and achieve the improvement of filtration efficiency while suppressing the decrease in isostatic strength.

SUMMARY OF THE INVENTION

According to the present invention, there is provided a honeycomb filter to be described below.

[1] A honeycomb filter including: a pillar-shaped honeycomb structure body that includes a porous partition wall disposed to surround a plurality of cells acting as fluid through channels extending from an inflow end face to an outflow end face; and a plugging portion that is disposed to plug an end of one of the inflow end face and the outflow end face for each of the cells, wherein an open frontal area O (%) of the cells in the honeycomb structure body is 75 to 80%, a porosity P (%) of the partition wall measured by a mercury press-in method is 52 to 58%, an average pore diameter D (μm) of the partition wall measured by the mercury press-in method is 6 to 12 μm, and a pore volume rate A (%) of pores whose pore diameters are not less than 20 μm with respect to an overall pore volume of the partition wall is not more than 13.5%.

[2] The honeycomb filter according to [1], wherein a value obtained by multiplying absolute values of respective values of the open frontal area O (%), the porosity P (%), and the average pore diameter D (μm) is more than 32000 and is less than 38500.

[3] The honeycomb filter according to [1] or [2], wherein a thickness of the partition wall is 0.191 to 0.241 mm.

[4] The honeycomb filter according to any one of [1] to [3], wherein a cell density of the honeycomb structure body is 27 to 35 cells/cm$^2$.

[5] The honeycomb filter according to any one of [1] to [4], wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

Effects of the Invention

The honeycomb filter according to the present invention has an effect that the rise in pressure loss can be suppressed and the improvement of filtration efficiency can be achieved while suppressing the decrease in isostatic strength. For this reason, according to the honeycomb filter of the present invention, the rise in pressure loss can be suppressed and filtration efficiency can be improved while securing the strength required for the canning into a can body acting as a housing. Particularly, in the honeycomb filter according to the present invention, the open frontal area O (%) of the honeycomb structure body, the porosity P (%) of the partition wall, the average pore diameter D (μm) of the partition wall, and the pore volume rate A (%) of pores whose pore diameters are not less than 20 μm can be respectively set into specified numeric ranges as important configurations. By employing such the configurations, disadvantages of each other can be effectively supplemented and advantages of each other can be effectively utilized by combining the effects of the respective configurations.

DESCRIPTION OF THE PREFERRED EMBODIMENTS

Hereinafter, exemplary embodiments of the present invention will be explained, but the present invention is not limited to the following embodiments. Therefore, it should be understood that those in which modifications, improvements, etc. have been appropriately added to the following embodiments are within the scope of the present invention based on the ordinary knowledge of those skilled in the art without departing from the spirit of the present invention.

(1) Honeycomb Filter

Figure 1:
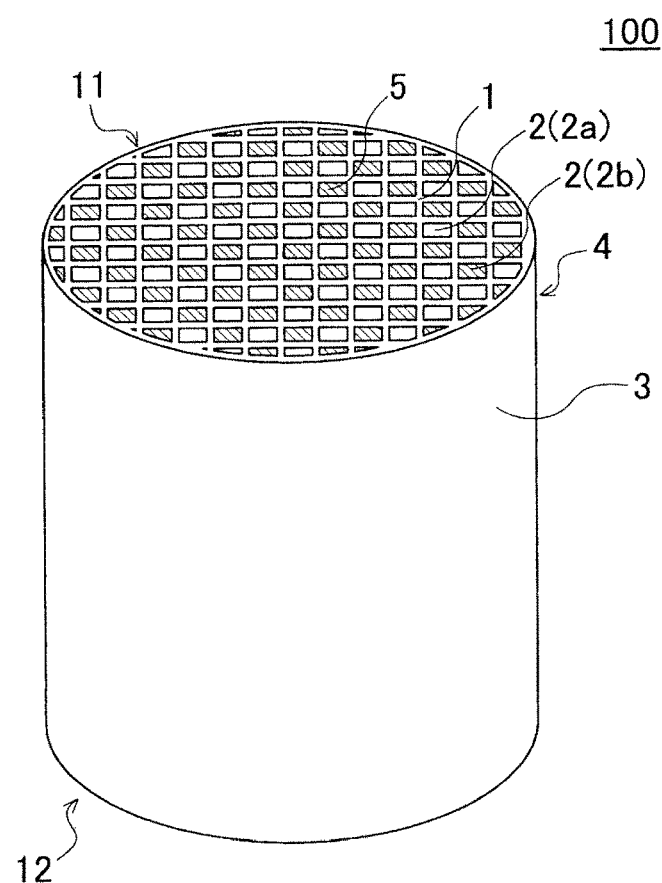
FIG. 1 is a perspective view schematically showing one embodiment of a honeycomb filter according to the present invention.
Figure 2:
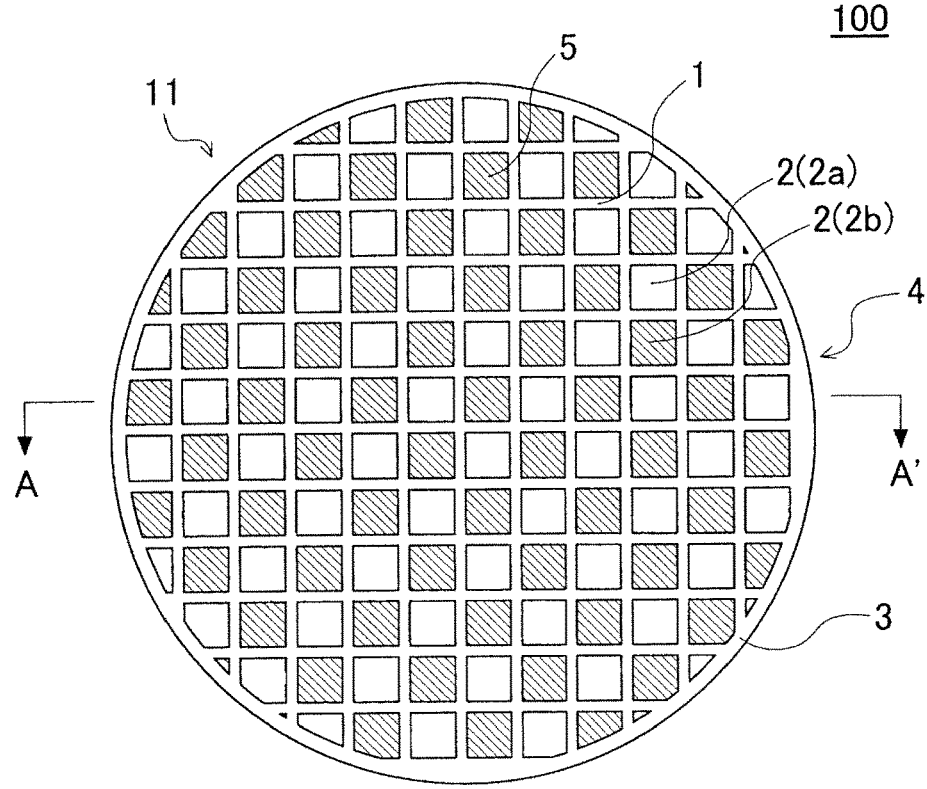
FIG. 2 is a plan view showing an inflow end face of the honeycomb filter shown in FIG. 1.
Figure 3:
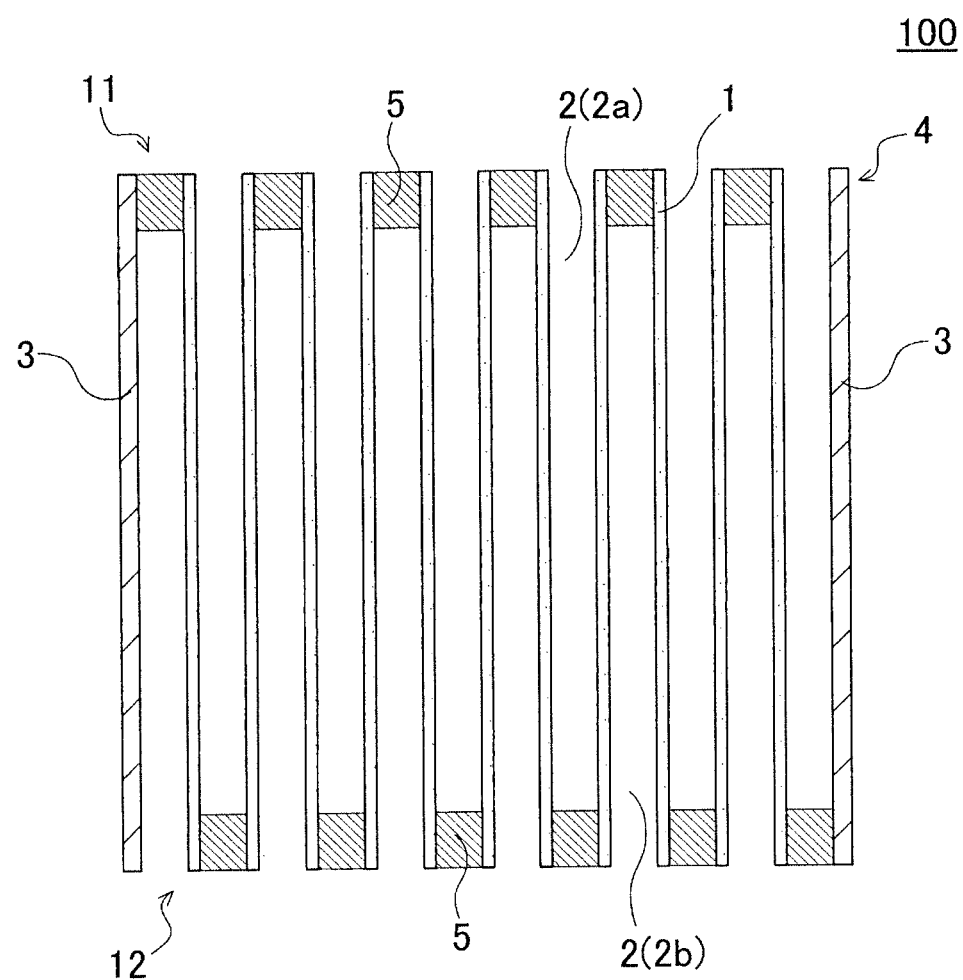
FIG. 3 is a cross-sectional view schematically showing a cross section viewed from the A-A' line in FIG. 2.

A honeycomb filter according to one embodiment of the present invention is a honeycomb filter 100 as shown in FIGS. 1 to 3. Herein, FIG. 1 is a perspective view schematically showing one embodiment of the honeycomb filter according to the present invention. FIG. 2 is a plan view showing the inflow end face of the honeycomb filter shown in FIG. 1. FIG. 3 is a cross-sectional view schematically showing a cross section viewed from the A-A' line in FIG. 2.

As shown in FIGS. 1 to 3, the honeycomb filter 100 according to the present embodiment includes a pillar-shaped honeycomb structure body 4 and a plugging portion 5 disposed to plug the end of one of an inflow end face 11 and an outflow end face 12 for each of cells 2 acting as fluid through channels. The honeycomb structure body 4 includes a porous partition wall 1 disposed to surround the plurality of cells 2 extending from the inflow end face 11 to the outflow end face 12. In the honeycomb filter 100 according to the present embodiment, the honeycomb structure body 4 is configured to be a round pillar shape and further includes a circumferential wall 3 on its circumferential side face. In other words, the circumferential wall 3 is disposed to surround the partition wall 1 disposed in a grid pattern.

The honeycomb filter 100 has an open frontal area O (%) of the cells 2 of the honeycomb structure body 4 that is 75 to 80%. Hereinafter, the open frontal area O (%) of the cells 2 of the honeycomb structure body 4 may be simply called "the open frontal area O (%) of the cells 2" or "the open frontal area O (%)". In addition, the "open frontal area O (%)" is a percentage of a ratio of an area SI of the cells 2 excluding the partition wall 1 and the circumferential wall 3 with respect to an area S0 of a cross section orthogonal to the direction of extension of the cells 2 of the honeycomb structure body 4. The "open frontal area O (%)" can be calculated by measuring, for example, one of end faces of the honeycomb structure body 4 by using an image analyzer ("NEXIV, VMR-1515 (product name)" made by Nikon) for example.

The honeycomb filter 100 has a porosity P (%) of the partition wall 1 measured by a mercury press-in method that is 52 to 58%. The "porosity P (%)" of the partition wall 1 can be measured by using Autopore 9500 (product name) made by Micromeritics for example.

The honeycomb filter 100 has an average pore diameter D (μm) of the partition wall 1 measured by the mercury press-in method that is 6 to 12 μm. Moreover, a pore volume rate A (%) of pores whose pore diameters are not less than 20 μm with respect to the overall pore volume of the partition wall 1 is not more than 13.5%. Hereinafter, the pore volume rate A (%) of pores whose pore diameters are not less than 20 μm with respect to the overall pore volume of the partition wall 1 may be simply called "the pore volume rate A (%) of pores not less than 20 μm". Similarly to the measurement of the porosity P (%), "the average pore diameter D (μm)" and "the pore volume rate A (%) of pores not less than 20 μm" of the partition wall 1 can be measured by using Autopore 9500 (product name) made by Micromeritics for example.

For example, by the following method, the overall pore volume and the pore volume of pores not less than 20 μm of the partition wall 1 can be calculated by measuring the cumulative pore volume of the partition wall 1. First, a test piece to measure the cumulative pore volume is made after cutting out a portion of the partition wall 1 from the honeycomb filter 100. The size of the test piece has no particular limitation, but it is preferable that the test piece is a rectangular solid whose sizes of the length, width, and height are respectively approximately 10 mm, approximately 10 mm, and approximately 10 mm, for example. A region of the partition wall 1 from which the test piece is cut out has no particular limitation, but it is preferable that the test piece is made by being cut out from near the center in the axial direction of the honeycomb structure body 4. The obtained test piece is housed inside a cell for measurement of a measuring device, and the cell for measurement is depressurized. Next, mercury is introduced into the cell for measurement. Next, mercury introduced into the cell for measurement is pressurized and the volume of mercury pushed into the pores in the test piece is measured during pressurization. In this case, as the pressure to be added to mercury is increased, mercury is sequentially pushed into from pores having large pore diameters toward pores having small pore diameters. Therefore, a relationship between "the pore diameters of pores formed in the test piece" and "the cumulative pore volume" can be calculated from a relationship between "the pressure to be added to mercury" and "the volume of mercury pushed into the pores". "The cumulative pore volume" is a value obtained by accumulating the pore volumes from the minimum pore diameter to the specified pore diameter. For example, "the pore volume rate of the pore diameters not less than 20 μm" is a percentage ($PV_{al}/PV_{all} \times 100\%$) of a ratio of a pore volume $PV_{al}$ of pores whose pore diameters are not less than 20 μm with respect to an overall pore volume $PV_{all}$ indicated by the cumulative pore volume.

The honeycomb filter 100 has an effect that the rise in pressure loss can be suppressed and the improvement of filtration efficiency can be achieved while suppressing the decrease in isostatic strength. For this reason, according to the honeycomb filter 100 of the present embodiment, the rise in pressure loss can be suppressed and filtration efficiency can be improved while securing the strength required for the canning into a can body acting as a housing. Particularly, the important configurations of the honeycomb filter 100 according to the present embodiment are to set four parameters of "the open frontal area O (%)", "the porosity P (%)", "the average pore diameter D (μm)", and "the pore volume rate A (%) of pores not less than 20 μm" to specified numeric ranges. By employing such the configurations, disadvantages of each other can be effectively supplemented and advantages of each other can be effectively utilized by combining the effects from the respective configurations.

For example, when the open frontal area O (%) is less than 75%, it is difficult to suppress the rise in pressure loss even if the other three parameters are in the numeric ranges. When the open frontal area O (%) exceeds 80%, it is difficult to secure the strength required for canning. Moreover, when the porosity P (%) is less than 52%, it is difficult to suppress the rise in pressure loss even if the other three parameters are in the numeric ranges. Moreover, when the porosity P (%) exceeds 58%, it is difficult to obtain the strength required for canning. Moreover, when the average pore diameter D (μm) is less than 6 μm, the pressure loss is deteriorated. when the average pore diameter D (μm) exceeds 12 μm, filtration efficiency is deteriorated. Moreover, when the pore volume rate A (%) of pores not less than 20 μm exceeds 13.5%, filtration efficiency is deteriorated.

Although it is not particularly limited, the open frontal area O (%) is preferably 76 to 79% and is further preferably 77 to 78%. The porosity P (%) of the partition wall 1 is preferably 53 to 57% and is further preferably 54 to 56%. The average pore diameter D (μm) of the partition wall 1 is preferably 7 to 11 μm and is further preferably 8 to 10 μm. The pore volume rate A (%) of pores not less than 20 μm is preferably 12% or less and is further preferably 10% or less. In addition, the lower limit of the pore volume rate A (%) is 0%.

In the honeycomb filter 100, it is preferable that a value obtained by multiplying the absolute values of the respective values of "the open frontal area O (%)", "the porosity P (%)", and "the average pore diameter D (pun)" is more than 32000 and is less than 38500. By employing such the configuration, it is possible to favorably suppress the rise in pressure loss and to favorably improve filtration efficiency while sufficiently securing the strength required for canning. The case where the value obtained by multiplying these three values is less than 32000 is not preferable in that the pressure loss is raised. Moreover, the case where the value exceeds 38500 is not preferable in that it is difficult to obtain the strength required for canning. The value obtained by multiplying these three values is preferably 35500 to 38500 and is further preferably 36500 to 38500.

In the honeycomb filter 100, the thickness of the partition wall 1 is preferably 0.191 to 0.241 mm, is further preferably 0.203 to 0.229 mm, is still more preferably 0.208 to 0.224 mm, and is particularly preferably 0.213 to 0.218 mm. For example, the thickness of the partition wall 1 can be measured by using a scanning electron microscope or a microscope. When the thickness of the partition wall 1 is less than 0.191 mm, sufficient strength may not be obtained. On the other hand, when the thickness of the partition wall 1 exceeds 0.241 mm, the pressure loss may be increased.

The shape of the cells 2 formed in the honeycomb structure body 4 has no particular limitation. For example, the shape of the cells 2 in a cross section orthogonal to the direction of extension of the cells 2 can include a polygonal shape, a circular shape, an elliptical shape, etc. The polygonal shape can include a triangle, a quadrangle, a pentagon, a hexagon, an octagon, etc. Herein, it is preferable that the shape of the cells 2 is a triangle, a quadrangle, a pentagon, a hexagon, and/or an octagon. Moreover, in terms of the shape of the cells 2, the shapes of all the cells 2 may be the same or may be different. For example, although it is not shown, the cells may be configured by mixing quadrangular cells and octagonal cells. Moreover, in terms of the size of the cells 2, the sizes of all the cells 2 may be the same or may be different. For example, although it is not shown, among the plurality of cells, some of the cells may be made to be larger and the other cells may be made to be relatively smaller. In addition, in the present invention, the cell means a space surrounded by the partition wall.

The cell density of the cells 2 defined by the partition wall 1 is preferably 27 to 35 cells/cm$^2$, is further preferably 28 to 34 cells/cm$^2$, is still more preferably 29 to 33 cells/cm$^2$, and is particularly preferably 30 to 32 cells/cm$^2$. By employing such the configuration, the honeycomb filter 100 according to the present embodiment can be preferably used as a filter for exhaust gas purification to purify exhaust gas emitted from the engine of the automobile.

The circumferential wall 3 of the honeycomb structure body 4 may be integrally formed with the partition wall 1 or may be a circumferential coat layer formed by applying a circumferential coating material to surround the partition wall 1. Although it is not shown, during the manufacturing, the circumferential coat layer can be provided on the outer circumferential side of the partition wall after the partition wall and the circumferential wall are integrally formed and then the formed circumferential wall is removed by a well-known method such as grinding processing.

The shape of the honeycomb structure body 4 has no particular limitation. The shape of the honeycomb structure body 4 can be a pillar shape in which the shape of the inflow end face 11 and the outflow end face 12 includes a circular shape, an elliptical shape, a polygonal shape, etc.

The sizes of the honeycomb structure body 4, for example, the length from the inflow end face 11 to the outflow end face 12 and the size of a cross section orthogonal to the direction of extension of the cells 2 of the honeycomb structure body 4 have no particular limitation. When the honeycomb filter 100 according to the present embodiment is used as a purification member for exhaust gas purification, the sizes only need to be appropriately selected to obtain optimum purification performance. For example, the length of the honeycomb structure body 4 from the inflow end face 11 to the outflow end face 12 is preferably 90 to 160 mm and is further preferably 100 to 140 mm. The area of a cross section orthogonal to the direction of extension of the cells 2 of the honeycomb structure body 4 is preferably 8000 to 20000 mm$^2$ and is further preferably 10000 to 17000 mm$^2$.

It is preferable that the material of the partition wall 1 includes at least one kind selected from a group consisting of cordierite, silicon carbide, silicon-silicon carbide composite material, cordierite-silicon carbide composite material, silicon nitride, mullite, alumina, and aluminum titanate. The material constituting the partition wall 1 is preferably a material including 30% by mass or more of the materials listed in the above group, is further preferably a material including 40% by mass or more of the materials listed in the above group, and is particularly preferably a material including 50% by mass or more of the materials listed in the above group. Here, the silicon-silicon carbide composite material is a composite material formed by using silicon carbide as aggregates and silicon as bonding materials. Moreover, the cordierite-silicon carbide composite material is a composite material formed by using silicon carbide as aggregates and cordierite as bonding materials. In the honeycomb filter 100 according to the present embodiment, it is particularly preferable that the material constituting the partition wall 1 is cordierite.

In the honeycomb filter 100 according to the present embodiment, the plugging portions 5 are disposed at open ends on the inflow end face 11 of the predetermined cells 2 and at open ends on the outflow end face 12 of the residual cells 2. For example, the cells 2, in which the plugging portions 5 are disposed at open ends on the outflow end face 12 and the inflow end face 11 is opened, are called inflow cells 2a. Moreover, the cells 2, in which the plugging portions 5 are disposed at open ends on the inflow end face 11 and the outflow end face 12 is opened, are called outflow cells 2b. It is preferable that the inflow cells 2a and the outflow cells 2b are alternately arranged with the partition wall 1 therebetween. Thereby, it is preferable that a checkered pattern is formed on both end faces of the honeycomb filter 100 due to "the plugging portions 5" and "the open ends of the cells 2".

It is preferable that the material of the plugging portions 5 is a material considered to be preferable as the material of the partition wall 1. The material of the plugging portions 5 and the material of the partition wall 1 may be the same or may be different.

In the honeycomb filter 100 according to the present embodiment, a catalyst for exhaust gas purification may be loaded in the partition wall 1 defining the plurality of cells 2. Loading a catalyst in the partition wall 1 means that a catalyst is loaded on the surface of the partition wall 1 and in the pores formed in the partition wall 1. Particularly, because an amount of a catalyst to be loaded in the pores formed in the partition wall 1 can be increased in the honeycomb filter 100 according to the present embodiment, it is possible to suppress the rise in pressure loss after the catalyst for exhaust gas purification is loaded.

(2) Manufacturing Method of Honeycomb Filter

A method of manufacturing the honeycomb filter according to the present invention has no particular limitation. For example, the manufacturing method can include the following method. First, a plastic kneaded material to make a honeycomb structure body is prepared. The kneaded material to make the honeycomb structure body can be prepared as raw material powder by appropriately adding an addition agent such as binder, a pore former, and water to a material selected from among the preferable materials of the honeycomb structure body described above. The raw material powder can employ, for example, powder obtained by mixing silicon carbide powder and metallic silicon powder. The binder can include, for example, methylcellulose, hydroxypropyl methylcellulose, etc. Moreover, the addition agent can include surfactant etc. A pore size distribution such as the porosity and the average pore diameter of the partition wall can be adjusted by adjusting the particle diameter of the pore former and its addition amount.

Next, the pillar-shaped honeycomb formed body that includes a partition wall defining the plurality of cells and a circumferential wall disposed to surround the partition wall is made by performing extrusion of the kneaded material obtained in this way. In the extrusion, a die for extrusion can employ a die in which a slit having the inverted shape of the honeycomb formed body to be formed is formed on the extrusion surface for the kneaded material. The open frontal area of the cells in the honeycomb structure body can be adjusted by adjusting the shape of the slit.

Next, the obtained honeycomb formed body is dried by using a microwave and hot air, for example. Moreover, plugging portions are made by plugging the open ends of the cells of the honeycomb formed body before drying or after drying. The plugging portions can employ the same material as the material used for making the honeycomb formed body, for example. The honeycomb formed body may be further dried after the plugging portions are made.

Next, a honeycomb filter is manufactured by firing the honeycomb formed body. A firing temperature and a firing environment are different depending on a raw material. Those skilled in the art can select the most suitable firing temperature and firing environment for the selected material.

EXAMPLES

Hereinafter, the present invention will be more specifically explained by using Examples, but the present invention is not limited to these Examples.

Example 1

A kneaded material was prepared by adding a pore former of 2 parts by mass, a dispersing medium of 2 parts by mass, and an organic binder of 7 parts by mass to a cordierite forming raw material of 100 parts by mass and by mixing and kneading these. Alumina, aluminum hydroxide, kaolin, talc, and silica were employed as the cordierite forming raw material. Water was employed as the dispersing medium. Methylcellulose was employed as the organic binder. Dextrin was employed as the dispersing agent.

Silica gel and acrylic resin polymer having the average particle diameter of 15 µm were used as the pore former. In addition, the pore volume rate of pores not less than 20 µm was controlled by using silica gel to suppress the coarsening of pores (i.e., pores formed in partition wall) as the pore former.

Next, the honeycomb formed body whose entire shape is a round pillar shape was obtained by performing extrusion of the kneaded material by using the die for making the honeycomb formed body. The shape of the cells of the honeycomb formed body was a quadrangle.

Next, the honeycomb formed body was adjusted to a predetermined size by drying the honeycomb formed body with a microwave dryer and further completely drying the body with a hot-air drying machine and then cutting both end faces of the honeycomb formed body.

Next, the plugging portions were formed on the dried honeycomb formed body. More specifically, masking was first performed on the inflow end face of the honeycomb formed body so as to cover the inflow cells. After that, the masked end of the honeycomb formed body was dipped in plugging slurry and plugging slurry was filled up into the open ends of the unmasked outflow cells. After that, also on the outflow end face of the honeycomb formed body, plugging slurry was filled up into the open ends of the inflow cells in the same way as above. After that, the honeycomb formed body on which the plugging portions are formed was further dried with the hot-air drying machine.

Next, the honeycomb filter according to Example 1 was manufactured by degreasing and firing the dried honeycomb formed body.

The honeycomb filter according to Example 1 was a filter whose shape is a round pillar shape in which the shape of the inflow end face and the outflow end face is a circular shape. The size of the diameter of the inflow end face and the outflow end face was 118 mm. Moreover, the length in the direction of extension of the cells of the honeycomb filter was 127 mm. In the honeycomb filter according to Example 1, the thickness of the partition wall was 0.216 mm and the cell density was 31 cells/cm$^2$. Moreover, the open frontal area O (%) of the cells of the honeycomb structure body was 77.4%. The column of "Open frontal area O (%)" in Table 1 indicates the value of the open frontal area O (%) of the cells of the honeycomb structure body.

TABLE 1

|  | Cell density (cells/cm²) | Partition wall thickness (mm) | Porosity P (%) | Area ratio O (%) | Average pore diameter D (μm) | Pore volume rate A (%) of pores not less than 20 μm | P × O × D |
|---|---|---|---|---|---|---|---|
| Example 1 | 31 | 0.216 | 55.0 | 77.4 | 9.0 | 10.0 | 38313.0 |
| Example 2 |  | 0.241 | 55.0 | 75.0 | 9.0 | 10.0 | 37125.0 |
| Example 3 |  | 0.216 | 55.0 | 77.4 | 12.0 | 12.5 | 51084.0 |
| Example 4 |  | 0.241 | 52.0 | 75.0 | 6.0 | 4.0 | 23400.0 |
| Example 5 |  | 0.216 | 52.0 | 77.4 | 6.0 | 4.0 | 24148.8 |
| Example 6 |  | 0.216 | 52.0 | 77.4 | 9.0 | 9.0 | 36223.2 |
| Example 7 |  | 0.191 | 52.0 | 80.0 | 9.0 | 9.0 | 37440.0 |
| Example 8 |  | 0.241 | 52.0 | 75.0 | 9.0 | 9.0 | 35100.0 |
| Example 9 |  | 0.241 | 58.0 | 75.0 | 12.0 | 13.5 | 52200.0 |
| Example 10 |  | 0.229 | 58.0 | 76.2 | 6.0 | 5.0 | 26517.6 |

Moreover, in the following method, the measurements of "the porosity P (%)", "the average pore diameter D (μm)", and "the pore volume rate A (%) of pores not less than 20 μm" were performed on the honeycomb filter according to Example 1. Their results are indicated in Table 1.

Porosity P (%)

The porosity P (%) of the partition wall was measured by using Autopore 9500 (product name) made by Micromeritics. The measurement of the porosity P (%) was performed, after cutting out a portion of the partition wall from the honeycomb filter as a test piece, by using the obtained test piece. The test piece was a rectangular solid in which the sizes of the length, width, and height respectively are approximately 10 mm, approximately 10 mm, and approximately 10 mm. In addition, the test piece was obtained by cutting out near the center of the honeycomb filter in the axial direction.

Average Pore Diameter D (μm)

The average pore diameter D (μm) of the partition wall was measured by using Autopore 9500 (product name) made by Micromeritics. The measurement of the average pore diameter D (μm) was also performed by using the test piece used for the measurement of the porosity P (%).

Pore Volume Rate A (%) of Pores not less than 20 μm

In the measurement of the pore volume rate A (%) of pores not less than 20 μm, a cumulative pore volume of the partition wall was first measured. The overall pore volume and the pore volume of pores not less than 20 μm of the partition wall were calculated from the measured cumulative pore volume of the partition wall, and the pore volume rate A (%) of pores not less than 20 μm was calculated based on these values. The cumulative pore volume of the partition wall was measured by using Autopore 9500 (product name) made by Micromeritics.

In the honeycomb filter according to Example 1, the porosity P (%) was 55%, the average pore diameter D (μm) was 9.0 μm, and the pore volume rate A (%) of pores not less than 20 μm was 10.0%. Moreover, a value obtained by multiplying the absolute values of the respective values of the open frontal area O (%), the porosity P (%), and the average pore diameter D (μm) was 38313. The column of "P×O×D" in Table 1 indicates the results.

By the following method, the measurements of "isostatic strength evaluation" "filtration efficiency performance evaluation", and "pressure loss performance evaluation" were performed on the honeycomb filter according to Example 1. Their results are indicated in Table 2.

Isostatic Strength Evaluation

The isostatic strengths (MPa) of the honeycomb filters according to Examples and Comparative Examples were measured according to a measuring method of isostatic fracture strength defined by JASO standard M505-87 that is automotive standards issued by Society of Automotive Engineers of Japan, Inc. The measured values of the isostatic strengths (MPa) are indicated in Table 2. Moreover, assuming that the value of the isostatic strength of the honeycomb filter according to Comparative Example 1 is 100%, the ratios of isostatic strengths of the honeycomb filters are indicated in the column of "Isostatic strength ratio (%)" in Table 2. In the isostatic strength evaluation, the evaluations for the honeycomb filters according to Examples were performed based on the following evaluation criterion.

Evaluation "Excellent": the evaluation is regarded as "Excellent" when the value of the isostatic strength ratio (%) is not less than 120%.

Evaluation "Good": the evaluation is regarded as "Good" when the value of the isostatic strength ratio (%) is not less than 110% and is less than 120%.

Evaluation "Acceptable": the evaluation is regarded as "Acceptable" when the value of the isostatic strength ratio (%) is more than 100% and is less than 110%.

Evaluation "Unacceptable": the evaluation is regarded as "Unacceptable" when the value of the isostatic strength ratio (%) is not more than 100%.

Filtration Efficiency Performance Evaluation

First, an exhaust gas purification device in which the honeycomb filters according to Examples and Comparative Examples are regarded as a filter for exhaust gas purification was made. Next, the number of soot particles contained in gas emitted from the outlet of the exhaust gas purification device was measured by a PN measuring method after connecting the made exhaust gas purification device to the outlet side of the engine exhaust manifold of the 1.2 L direct injection type gasoline engine vehicle. "The PN measuring method" is a measuring method proposed by Particle Measurement Program (abbreviation PMP) by the Working Party on Pollution and Energy (abbreviation GRPE) of World Forum for Harmonization of Vehicle Regulations (abbreviation WP29) in Economic Commission for Europe (abbreviation ECE) of United Nations (abbreviation UN). More specifically, in the determination of the number of soot particles, assuming that the cumulative number of soot particles emitted after running in the WLTC (Worldwide harmonized Light duty Test Cycle) mode is the number of soot particles of the exhaust gas purification device that is a determination target, a filtration efficiency (%) was calculated from the number of soot particles. The values of the filtration efficiencies (%) of the honeycomb filters are indicated in Table 2. The column of "Filtration efficiency ratio (%)" in Table 2 indicates the values (%) of the filtration efficiency of the exhaust gas purification device that uses the honeycomb filters according to Examples, assuming that the value of the filtration efficiency of the exhaust gas purification device that uses the honeycomb filter according to Comparative Example 1 is 100%. In the filtration efficiency performance evaluation, the evaluations for the honeycomb filters according to Examples were performed based on the following evaluation criterion.

Evaluation "Excellent": the evaluation is regarded as "Excellent" when the value of the filtration efficiency ratio (%) is not less than 130%.

Evaluation "Good": the evaluation is regarded as "Good" when the value of the filtration efficiency ratio (%) is not less than 125% and is less than 130%.

Evaluation "Acceptable": the evaluation is regarded as "Acceptable" when the value of the filtration efficiency ratio (%) is more than 120% and is less than 125%.

Evaluation "Unacceptable": the evaluation is regarded as "Unacceptable" when the value of the filtration efficiency ratio (%) is not more than 120%.

Pressure Loss Performance Evaluation

Soot in exhaust gas was trapped by using the partition walls of the honeycomb filters after causing exhaust gas emitted from the 1.4 L direct injection type gasoline engine to flow into the honeycomb filters according to Examples and Comparative Examples. The trapping of the soot was performed until the deposition amount of soot per unit volume (1 L) of the honeycomb filter is 1 g/L. Then, pressures at the inflow end face and the outflow end face of the honeycomb filter were measured after causing engine exhaust gas at 200° C. to be introduced at the flow rate of 1.0 Nm$^3$/min in the state where the deposition amount of soot is 1 g/L. Then, a pressure loss (kPa) of the honeycomb filter was calculated by calculating a pressure difference between the inflow end face and the outflow end face. Their results are indicated in Table 2. The column of "Pressure loss ratio (%)" in Table 2 indicates the values (%) of the pressure losses in the honeycomb filters according to Examples assuming that the value of the pressure loss in the honeycomb filter according to Comparative Example 1 is 100%/o. In the pressure loss performance evaluation, evaluations for the honeycomb filters according to Examples were performed based on the following evaluation criterion.

Evaluation "Excellent": the evaluation is regarded as "Excellent" when the value of the pressure loss ratio (%) is less than 70%.

Evaluation "Good": the evaluation is regarded as "Good" when the value of the pressure loss ratio (%) is not less than 70% and is not more than 80%.

Evaluation "Acceptable": the evaluation is regarded as "Acceptable" when the value of the pressure loss ratio (%) is more than 80% and is not more than 85%.

Evaluation "Unacceptable": the evaluation is regarded as "Unacceptable" when the value of the pressure loss ratio (%) is more than 85%.

TABLE 2

|  | Isostatic strength (MPa) | Filtration efficiency (%) | Pressure loss (kPa) | Isostatic strength ratio (%) | Filtration efficiency ratio (%) | Pressure loss ratio (%) | Isostatic strength evaluation | Filtration efficiency performance evaluation | Pressure loss performance evaluation |
|---|---|---|---|---|---|---|---|---|---|
| Example 1 | 3.0 | 90 | 3 | 107% | 129% | 71% | Acceptable | Good | Good |
| Example 2 | 3.3 | 93 | 3.15 | 118% | 133% | 75% | Good | Excellent | Good |
| Example 3 | 3.0 | 88.5 | 2.95 | 107% | 126% | 70% | Acceptable | Good | Good |
| Example 4 | 3.6 | 93 | 3.3 | 129% | 133% | 79% | Excellent | Excellent | Good |
| Example 5 | 3.3 | 91.5 | 3.23 | 118% | 131% | 77% | Good | Excellent | Good |
| Example 6 | 3.3 | 90 | 3.17 | 118% | 129% | 75% | Good | Good | Good |
| Example 7 | 3.0 | 87 | 2.87 | 107% | 124% | 68% | Acceptable | Acceptable | Excellent |
| Example 8 | 3.6 | 93 | 3.47 | 129% | 133% | 83% | Excellent | Excellent | Acceptable |
| Example 9 | 3.0 | 90 | 2.93 | 107% | 129% | 70% | Acceptable | Good | Good |
| Example 10 | 2.9 | 93 | 3.1 | 102% | 133% | 74% | Acceptable | Excellent | Good |

Examples 2 to 10

The honeycomb filters were made in the same manner as in Example 1 except that the open frontal area O (%), the porosity P (%), the average pore diameter D (μm), and the pore volume rate A (%) of pores not less than 20 μm are changed as indicated in Table 1. In Examples 2 to 10, the open frontal area O (%) was adjusted by adjusting the shape of the slit of the die for extrusion. Moreover, the adjustments of the porosity P (%), the average pore diameter D (μm), and the pore volume rate A (%) of pores not less than 20 μm were performed by the following method. In Example 2, the porosity P (%), the average pore diameter D (μm), and the pore volume rate A (%) of pores not less than 20 μm were adjusted in the same manner as in Example 1. In Example 3, the average pore diameter D (μm) and the pore volume rate A (%) of pores not less than 20 μm were adjusted during the preparation of the kneaded material. In Examples 4 to 10, the porosity P (%), the average pore diameter D (μm), and the pore volume rate A (%) of pores not less than 20 μm were adjusted during the preparation of the kneaded material.

Comparative Examples 1 to 7

The honeycomb filters were made in the same manner as in Example 1 except that the open frontal area O (%), the porosity P (%), the average pore diameter D (μm), and the pore volume rate A (%) of pores not less than 20 μm are changed as indicated in Table 3. In Comparative Examples 1 to 7, the open frontal area O (%) was adjusted by adjusting the shape of the slit of the die for extrusion. Moreover, in Comparative Examples 1 to 7, the porosity P (%), the average pore diameter D (μm), and the pore volume rate A (%) of pores not less than 20 μm were adjusted during the preparation of the kneaded material.

TABLE 3

|  | Cell density (cells/cm²) | Partition wall thickness (mm) | Porosity P (%) | Area ratio O (%) | Average pore diameter D (μm) | Pore volume rate A (%) of pores not less than 20 μm | P × O × D |
|---|---|---|---|---|---|---|---|
| Comparative Example 1 | 34 | 0.152 | 48.0 | 83.0 | 12.0 | 18.0 | 47808.0 |
| Comparative Example 2 | 56 | 0.127 | 48.0 | 81.9 | 12.0 | 18.0 | 47174.4 |
| Comparative Example 3 | 47 | 0.216 | 63.0 | 72.7 | 19.0 | 43.0 | 87021.9 |
| Comparative Example 4 | 47 | 0.254 | 63.0 | 68.4 | 19.0 | 43.0 | 81874.8 |
| Comparative Example 5 | 47 | 0.305 | 63.0 | 62.8 | 19.0 | 43.0 | 75171.6 |
| Comparative Example 6 | 37 | 0.229 | 63.0 | 74.1 | 19.0 | 43.0 | 88697.7 |
| Comparative Example 7 | 31 | 0.216 | 55.0 | 77.4 | 13.0 | 15.0 | 55341.0 |

TABLE 4

|  | Isostatic strength (MPa) | Filtration efficiency performance (%) | Pressure loss performance (kPa) | Isostatic strength ratio (%) | Filtration efficiency performance ratio (%) | Pressure loss performance ratio (%) | Isostatic strength evaluation | Filtration efficiency performance evaluation | Pressure loss performance evaluation |
|---|---|---|---|---|---|---|---|---|---|
| Comparative Example 1 | 2.8 | 70 | 4.2 | 100% | 100% | 100% | Criterion | Criterion | Criterion |
| Comparative Example 2 | 2.8 | 66 | 3.6 | 100% | 94% | 86% | Unacceptable | Unacceptable | Unacceptable |
| Comparative Example 3 | 2.4 | 70 | 2.85 | 86% | 100% | 68% | Unacceptable | Unacceptable | Excellent |
| Comparative Example 4 | 3.2 | 76 | 3 | 113% | 109% | 71% | Good | Unacceptable | Good |
| Comparative Example 5 | 4.2 | 84 | 3.2 | 148% | 120% | 76% | Excellent | Unacceptable | Good |
| Comparative Example 6 | 2.2 | 72 | 3 | 79% | 103% | 71% | Unacceptable | Unacceptable | Good |
| Comparative Example 7 | 2.8 | 75 | 3.3 | 100% | 107% | 79% | Unacceptable | Unacceptable | Good |

In the same manner as in Example 1, the measurements of "isostatic strength evaluation", "filtration efficiency performance evaluation", and "pressure loss performance evaluation" were performed on the honeycomb filters according to Examples 2 to 10 and Comparative Examples 1 to 7. Their results are indicated in Table 2 or Table 4.

(Result)

It was found that the honeycomb filters according to Examples 1 to 10 can improve the filtration efficiency and can suppress the rise in pressure loss while maintaining the required isostatic strength. On the other hand, it was found that the honeycomb filter according to Comparative Example 1 has small effects of each of the isostatic strength, the filtration efficiency improvement, and the rise suppression in pressure loss as compared to the honeycomb filters according to Examples 1 to 10. In addition, the porosity P (%) has the effect that the pressure loss is reduced by suppressing the permeation resistance of the partition wall to be low. There was a tendency that the effect of the pressure loss reduction is lowered and thus the decrease in strength becomes remarkable when the porosity P (%) is too high. There was a tendency that trapping performance is improved when the average pore diameter D (μm) becomes smaller. Regarding the open frontal area O (%), it was found that the required isostatic strength can be maintained the porosity P (%) is in the numeric range of 52 to 58%. Moreover, it was found that the pores of the partition wall become more uniform by setting the pore volume rate A (%) of pores not less than 20 μm to a certain value or less, which largely contributes to the improvement of isostatic strength.

INDUSTRIAL APPLICABILITY

The honeycomb filters according to the present invention can be used as a filter to remove PM in exhaust gas.

DESCRIPTION OF REFERENCE NUMERALS

1 partition wall,
2 cell,
2a inflow cell,
2b outflow cell,
3 circumferential wall,
4 honeycomb structure body,
5 plugging portion,
11 inflow end face,
12 outflow end face,
100 honeycomb filter.

What is claimed is:

1. A honeycomb filter comprising:
   a pillar-shaped honeycomb structure body that includes a porous partition wall disposed to surround a plurality of cells acting as fluid through channels extending from an inflow end face to an outflow end face; and
   a plugging portion that is disposed to plug an end of one of the inflow end face and the outflow end face for each of the cells, wherein
   an open frontal area O (%) of the cells in the honeycomb structure body is 75 to 80%,
   a porosity P (%) of the partition wall measured by a mercury press-in method is 52 to 58%,
   an average pore diameter D (μm) of the partition wall measured by the mercury press-in method is 6 to 12 μm, and
   a pore volume rate A (%) of pores whose pore diameters are not less than 20 μm with respect to an overall pore volume of the partition wall is not more than 13.5%.

2. The honeycomb filter according to claim 1, wherein a value obtained by multiplying absolute values of respective values of the open frontal area O (%), the porosity P (%), and the average pore diameter D (μm) is more than 32000 and is less than 38500.

3. The honeycomb filter according to claim 2, wherein a cell density of the honeycomb structure body is 27 to 35 cells/cm$^2$.

4. The honeycomb filter according to claim 3, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

5. The honeycomb filter according to claim 2, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

6. The honeycomb filter according to claim 1, wherein a thickness of the partition wall is 0.191 to 0.241 mm.

7. The honeycomb filter according to claim 2, wherein a thickness of the partition wall is 0.191 to 0.241 mm.

8. The honeycomb filter according to claim 7, wherein a cell density of the honeycomb structure body is 27 to 35 cells/cm$^2$.

9. The honeycomb filter according to claim 8, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

10. The honeycomb filter according to claim 7, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

11. The honeycomb filter according to claim 6, wherein a cell density of the honeycomb structure body is 27 to 35 cells/cm$^2$.

12. The honeycomb filter according to claim 11, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

13. The honeycomb filter according to claim 6, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

14. The honeycomb filter according to claim 1, wherein a cell density of the honeycomb structure body is 27 to 35 cells/cm$^2$.

15. The honeycomb filter according to claim 14, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

16. The honeycomb filter according to claim 1, wherein a material of the partition wall includes at least one kind selected from a group consisting of cordierite, silicon carbide, silicon-silicon carbide composite material, cordierite-silicon carbide composite material, silicon nitride, mullite, alumina, and aluminum titanate.

* * * * *